Figure 1:
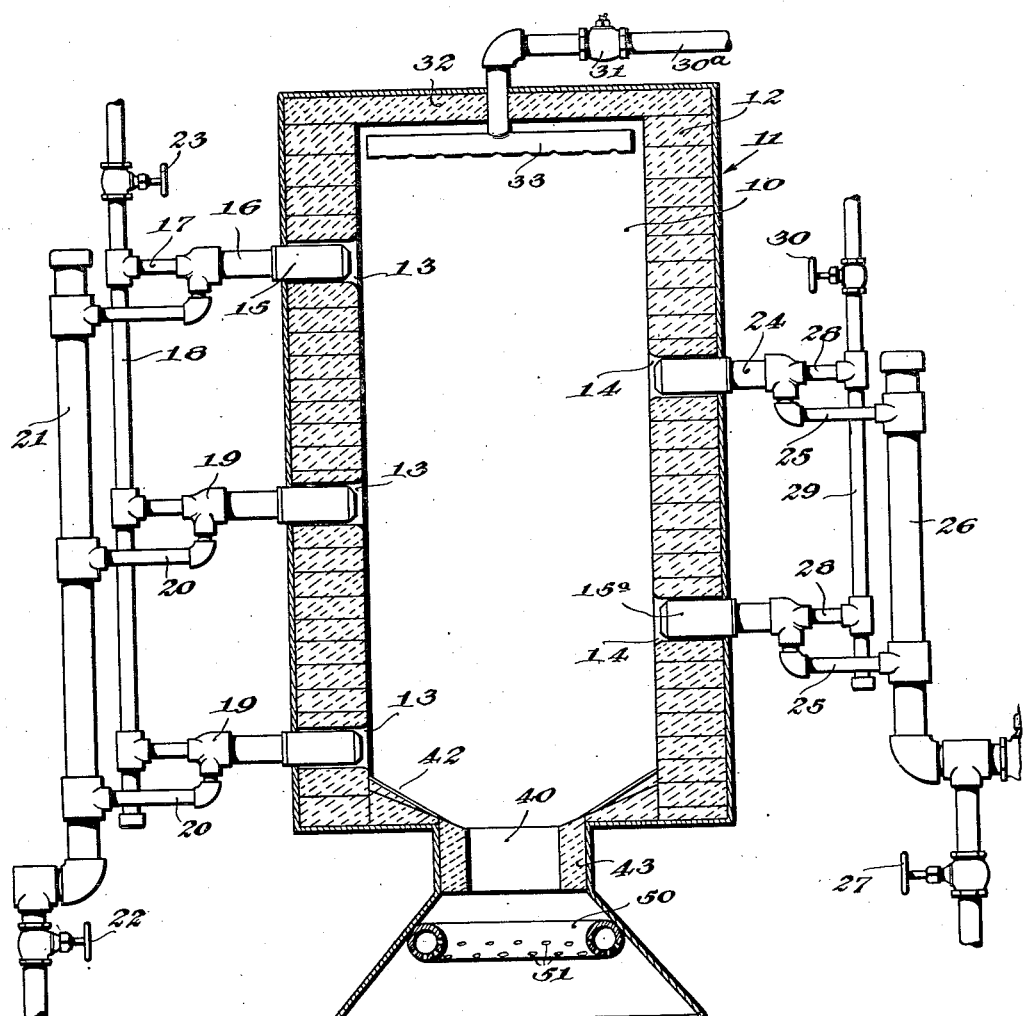

Aug. 12, 1930.   W. HUNT   1,773,002
APPARATUS FOR PRODUCING CARBON BLACK
Filed Jan. 19, 1928   2 Sheets-Sheet 2
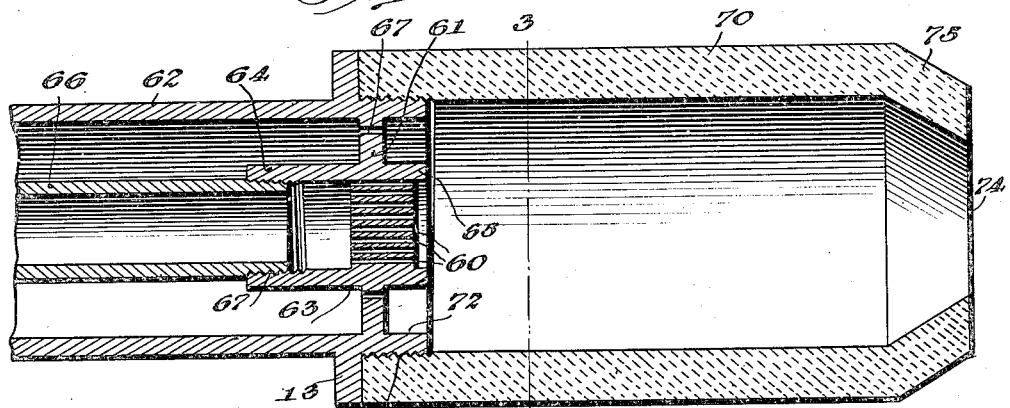
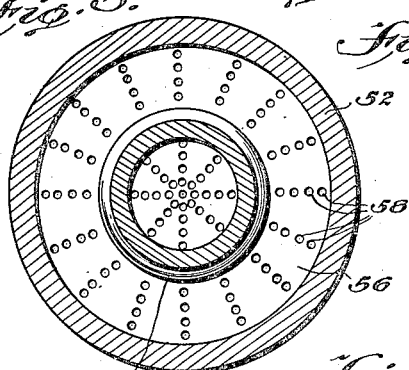
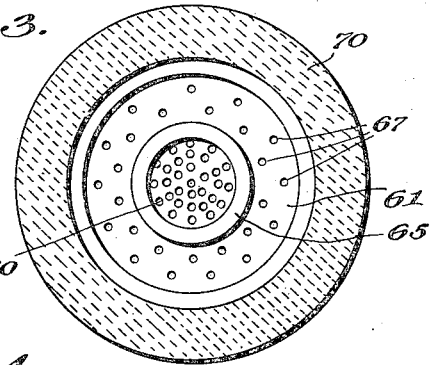
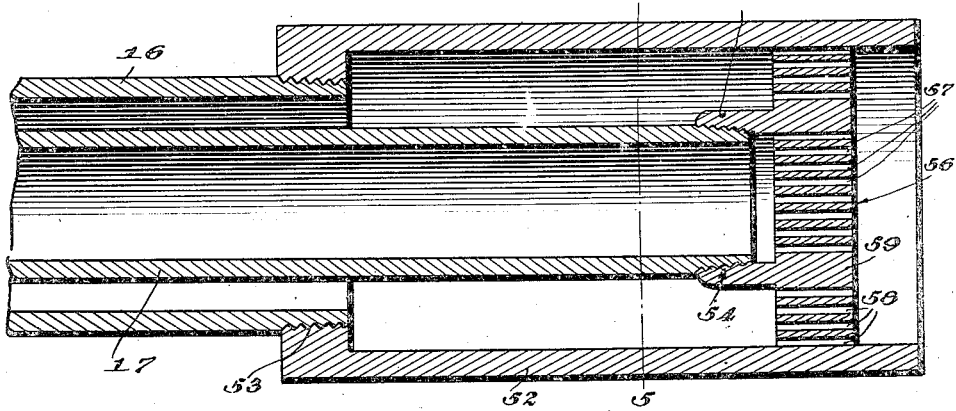
INVENTOR
William Hunt,
BY
ATTORNEY Patented Aug. 12, 1930

1,773,002

UNITED STATES PATENT OFFICE

WILLIAM HUNT, OF BALTIMORE, MARYLAND

APPARATUS FOR PRODUCING CARBON BLACK

Application filed January 19, 1928. Serial No. 247,998.

This invention relates to an apparatus for producing carbon black from gases.

An object of the invention is the provision of a furnace for producing carbon black, sometimes known as gas black, from natural gas, still gas and stripped gas, and in which a plurality of burners are provided through which the gas is adapted to be forced in association with a flame for raising the temperature of the gas to a predetermined degree where the carbon is obtained.

Another object of the invention is the provision of a furnace equipped with a plurality of burners through which is forced a carbon producing gas and a gas for producing a flame in close association with the carbon producing gas, and in which the direct and radiant heating furnaces are employed for the production of the carbon black or gas black, with an additional supply of gas at a proper point in the furnace for increasing the production of the carbon or gas black.

A further object of the invention is the provision of a burner having a central passage through which a complete mixture of gas and air is forced and burned, and surrounded by a passage through which natural gas, still gas, and a stripped gas is forced, and in embracing relation with the central flame, a refractory tube or tunnel of suitable fire resistant material embracing the flame provides means for maintaining a constant heat with respect to the outer circular flow of the natural gas, still gas or stripped gas, the conditions of the flow being reversed when the mixture of gas and air is forced through the outer surrounding passage, while the natural gas, still gas or stripped gas is forced through the central passage, the burner, if desired, being equipped with a water jacket.

This invention will be best understood from a consideration of the foregoing description, in connection with the accompanying drawings; nevertheless, it is to be understood that the invention is not confined to the disclosure being susceptible of such changes and modifications as shall define no material departure from the salient features of the invention as expressed in the appended claims.

In the drawings:—

Figure 1 is a vertical section of a furnace constructed according to the principles of my invention, Figure 2 is a longitudinal vertical section of one form of a burner, Figure 3 is a transverse vertical section taken along the line 3—3 of Fig. 2, Figure 4 is a longitudinal vertical section of another form of the burner, Figure 5 is a transverse vertical section taken along the line 5—5 of Fig. 4.

Referring more particularly to the drawings, 10 designates generally a furnace having an outer shell 11 formed of metal and provided with a lining 12 formed of fire resistant material. The walls of the furnace are provided with horizontal passages 13 and 14, the passages 14 being in staggered relation with respect to the passages 13.

Burners 15 are located within the passages 13 and are sufficiently sealed to the wall to prevent the passage of air at these points to the furnace. A tube 16 is connected with the burner 15 to supply a combustible mixture to the burner while a tube 17 which is located centrally of the burner and of the tube 16 is to supply the carbon black producing gas. Each of the pipes 17 is connected with a main supply pipe 18, while each pipe 16 is connected by means of a T-joint 19, to a pipe 20 and a main supply pipe 21 which is controlled by means of a valve 22. The flow of the carbon black producing gas through the pipe 18 is controlled by means of a valve 23 at one side of the furnace.

On the opposite sides of the furnace are provided burners 15ª which are similar in construction to the burners 15 and each burner is connected to a pipe 24 which is supplied with a combustible mixture through a pipe 25 and a main supply pipe 26 which is controlled by means of a valve 27. A pipe 28 is located centrally of the pipe 24 and is connected to a main supply pipe 29 controlled by a valve 30 for supplying carbon black producing gas to the burner and in central relation with respect to the combustible mixture.

A pipe 30ª is provided with a manually operable valve 31 and extends through the upper wall 32 of the furnace 10 and is connected to a distributing device 33 adjacent the top of the said furnace.

The bottom of the furnace is provided with a discharge passage 40 which opens into a cooling tank 41. The bottom of the furnace 10 is inclined at an angle towards the passage 40, as shown at 42, the walls of the passage 40 being lined with fire resistant material as shown at 43.

The furnace 10 and the cooling chamber 41 are supported in any approved manner above the floor of a building so that the lower open end 44 may be disposed within a pan 45 which is filled to a predetermined height with a liquid such as water whereby the lower open ends of the cooling chamber are projected into the water. A discharge pipe 46 is connected with the lower end of the cooling chamber above the pan 45. Brackets 47 or any other suitable supporting means may be employed for maintaining the cooling chamber 41 above the floor 48. The pipe 50 of circular formation is located at the top of the cooling chamber 41 and below the passage 40 and is provided with a plurality of perforations 51 through which a cooling fluid is adapted to be forced and sprayed over the hot gases which contain carbon, entering the chamber 41.

Referring more particularly to Fig. 4, the burner 15 or 15ª is shown more in detail and consists of a cylindrical body member 52 having a passage 53 into which is threaded the pipe 16. The centrally disposed pipe 17 which extends longitudinally through the pipe 16 and through the body member 15, is threaded at 54 into a nipple 55 projecting inwardly from a burner plate 56 which may be formed integrally with the body member 52 or separately and secured to said body member. The central portion of the plate 56 is provided with a plurality of passages 57 through which the make gas or the gas which is adapted to produce the carbon black is forced and ignited by the ignited combustible mixture passing through a plurality of passages 58 formed in the burner plate 56 and in concentric relation with the series of passages 57. The two groups of passages are separated into individual burners by means of a ring 59 cast integrally with the plate 56.

Referring more particularly to Fig. 2, a modified form of burner is shown in which the combustible mixture is forced through a plurality of passages 60 disposed centrally of the burner plate 61 formed integrally with an outer conduit 62. A sleeve 63 is formed integrally with the plate 61 and extends in opposite directions from the plate as shown at 64 and 65. A concentrically disposed pipe 66 is threaded at 67 into the sleeve 64 and is adapted to supply a combustible mixture to the passages 60. The pipe 62 is adapted to supply the make gas and the carbon black producing gas to perforations 67 formed in the plate 61 and concentrically with respect to the passages 60. The outer portion of the sleeve 65 separates the centrally disposed burner having the passages 60 from the outwardly disposed burner having passages 67. A sleeve or tunnel 70 formed of suitable fire resisting material is threaded at 71 onto an outwardly projecting flange 72 of the conduit 62. An annular shoulder 73 also formed integrally with the conduit 62 is adapted to form an abutment for the inner end of the tunnel 70, the outer end of the tunnel adjacent the discharge port 74 is reduced in diameter by forming said outer end with inwardly inclined walls 75. The outer open end of the tunnel 70 may be the same diameter as the diameter of the body portion of said tunnel with the restricted opening 74 omitted.

The operation of my device is as follows:

The pipe 21 may be connected with a source of combustible fluid which is forced through the burners and ignited for igniting or heating a make gas to a high temperature which is supplied through the pipe 18 to the burner. This make gas may be either natural gas, artificial gas or still gas and it is the gas from which the carbon black is adapted to be produced. All of the connections to the sources of the supplies of the different kinds of fluids may be reversed and the igniting or heating gas may be supplied through the pipe 18 while the gas or fluid from which the carbon black is to be produced may be supplied through the pipe 21. An incomplete combustion of the carbon black producing gas is had in the furnace and the gases are passed through the restricted passage 40 through the perforated pipe 50 adjacent the outer end of the passage 40 where they are sprayed with a cooling fluid and discharged through the pipe 46. The carbon black or gas black being cooled, falls by gravity into the pan 45 from whence it is collected.

The burners 15 and 15ª are located in staggered relation to provide for an even distribution of the heat in the furnace, and when it is found necessary the carbon black producing gas may be supplied through the pipe 30 and through the distributor 33 at the upper end of the furnace chamber 10 in order to increase the supply of carbon black and also for maintaining a predetermined temperature in the furnace.

The burner shown in Fig. 2 has a tunnel 70 formed of fire resistant material which is adapted to be highly heated so that when the carbon black producing gas is forced through the conduit 62 it will be sufficiently heated not only by the flame from the burner comprising a series of perforations 60, but will also be heated by the tunnel 70, since this tunnel radiates heat to the carbon black producing gas in contact therewith.

The furnace, as will be appreciated, may be either located in a vertical or horizontal manner without affecting the quality of carbon black produced or the efficiency of the furnace. The gas which maintains the combustion may be supplied with a predetermined mixture of air for the efficient production of carbon black and these burners may be equipped with water jackets and provision may be made for forcing cool compressed air through the burners when necessary for cooling the same in order to provide for the proper operation of the furnace.

I claim:—

1. A furnace for producing carbon black comprising a combustion chamber, a plurality of burners located in staggered relation within the furnace, each burner adapted to supply a fluid for maintaining combustion and having means for supplying a fluid which is incompletely burned for producing the carbon black, means for cooling the combustion gases, and means for supplying fluids at a point in the furnace for increasing the quantity of fluid which produces the carbon black.

2. A furnace for producing carbon black comprising a combustion chamber, a plurality of burners located in staggered relation within the furnace, each burner adapted to supply a fluid for maintaining combustion and having means for supplying a fluid which is incompletely burned for producing the carbon black, and means for cooling the combustion gases, said furnace having a restricted discharge passage at the lower end thereof and opening into the cooling means.

3. A furnace for producing carbon black comprising a combustion chamber, a plurality of burners located in staggered relation within the furnace, each burner adapted to supply a fluid for maintaining combustion and having means for supplying a fluid which is incompletely burned for producing the carbon black, a cooling chamber having a restricted communication with the lower end of the furnace and provided with a shell at the lower end, and means in the cooling chamber for spraying the fluids and solids which enter said cooling chamber from the furnace.

4. A furnace for producing carbon black comprising a combustion chamber, a plurality of burners located in staggered relation within the furnace, each burner adapted to supply a fluid for maintaining combustion and having means for supplying a fluid which is incompletely burned for producing the carbon black, a cooling chamber having a restricted communication with the lower end of the furnace and provided with a shell at the lower end, a perforated passage in the cooling chamber adjacent the restricted communication between the cooling chamber and the furnace for spraying the combustible gases which pass from the furnace into the cooling chamber.

5. A furnace for producing carbon black comprising a combustion chamber, a plurality of burners located in staggered relation within the furnace, each burner adapted to supply a fluid for maintaining combustion and having means for supplying a fluid which is incompletely burned for producing the carbon black, a cooling chamber having a restricted communication with the lower end of the furnace and provided with a shell at the lower end, means for cooling the gases in the cooling chamber at a point in said cooling chamber where the gases from the furnace enter said cooling chamber.

6. A furnace for producing carbon black comprising a combustion chamber, a plurality of burners located in staggered relation within the furnace, each burner adapted to supply a fluid for maintaining combustion and having means for supplying a fluid which is incompletely burned for producing the carbon black, means for cooling the combustion gases, and means for supplying an additional quantity of fluid to the upper end of the furnace for augmenting the fluid which produces the carbon black.

7. A furnace for producing carbon black comprising a combustion chamber having oppositely disposed walls, a plurality of burners projecting from one wall, a plurality of burners projecting from the opposite wall and located in staggered relation with the burners projecting from the first-mentioned wall, each burner adapted to supply fluid for maintaining combustion and having means for supplying a fluid independently of the previously mentioned fluid, the last-mentioned fluid being adapted to be incompletely burned for producing carbon black, and means for cooling the combustion gases.

Signed at Baltimore, in the State of Maryland.

WILLIAM HUNT.